United States Patent [19]

Yamanishi

[11] Patent Number: 4,670,795
[45] Date of Patent: Jun. 2, 1987

[54] COLOR IMAGE FORMING APPARATUS AND METHOD

[75] Inventor: Eiichi Yamanishi, Yokohama, Japan

[73] Assignee: Kabushiki Kaisha Toshiba, Kawasaki, Japan

[21] Appl. No.: 632,215

[22] Filed: Jul. 18, 1984

[30] Foreign Application Priority Data

Jul. 18, 1983 [JP] Japan ................................ 58-130503
Jul. 18, 1983 [JP] Japan ................................ 58-130504

[51] Int. Cl.$^4$ ............................................ H04N 1/27
[52] U.S. Cl. .................................... 358/296; 358/300; 346/157; 355/4
[58] Field of Search ........................ 358/296, 300–302, 358/75, 78; 346/157, 74–77; 355/4

[56] References Cited

U.S. PATENT DOCUMENTS

| | | | |
|---|---|---|---|
| 3,801,197 | 4/1974 | Akiyama et al. ........................ | 355/4 |
| 4,447,832 | 5/1984 | Kurata et al. ........................ | 358/296 |
| 4,458,264 | 7/1984 | Tamara ................................. | 358/75 |
| 4,517,590 | 5/1985 | Nagashima et al. ................... | 358/75 |

FOREIGN PATENT DOCUMENTS 46750 3/1982 Japan ..................................... 358/75

Primary Examiner—E. A. Goldberg
Assistant Examiner—Patrick W. Foster
Attorney, Agent, or Firm—Cushman, Darby & Cushman

[57] ABSTRACT

A color image forming apparatus and method in which the color image information of the document, supplied from a reciprocally moving scanner is converted into color component signals corresponding to the color components of the ink ribbon. These component signals are sequentially supplied to the thermal head for each color component signal, and they are overlappingly transferred and copied onto the copy paper one color at a time. The scanner scans only the number of times equal to the number of color components of the ink ribbon. One color component signal is sequentially supplied to the thermal head at the time of each scanning, and the image of one color is formed simultaneously with the scanning. The copy paper is repositioned after each scanning and the process is repeated until all color components have been applied to the copy paper, thus producing a color copy of the original document.

16 Claims, 11 Drawing Figures

F I G. 10B
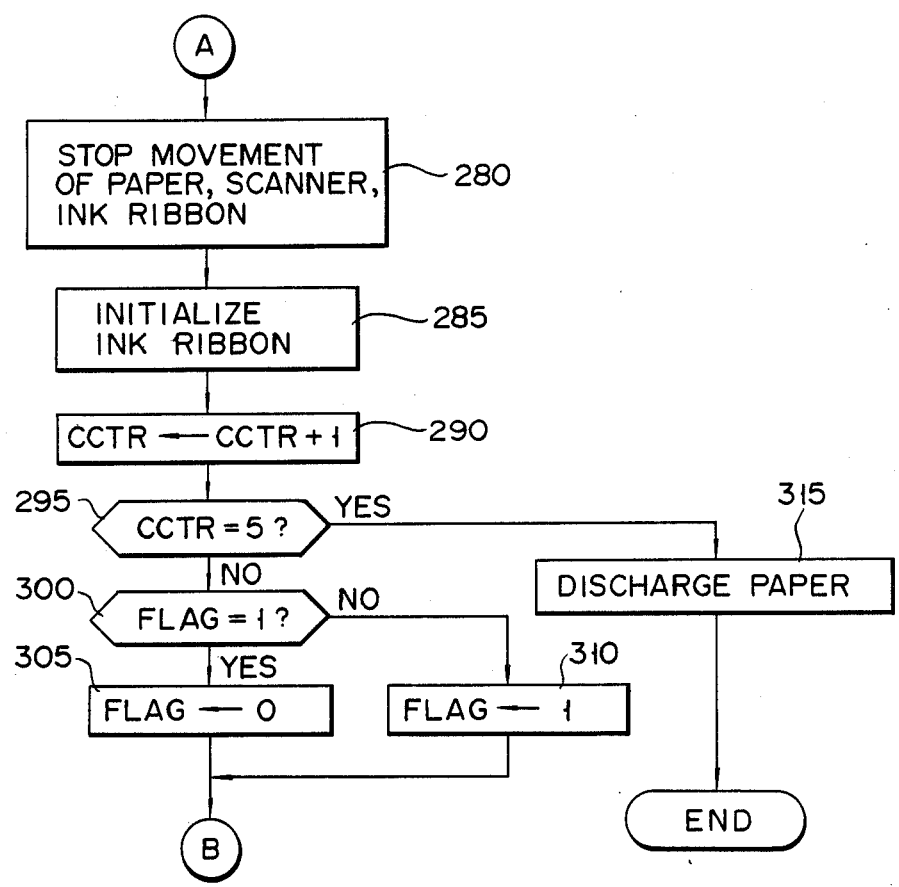

COLOR IMAGE FORMING APPARATUS AND METHOD

BACKGROUND OF THE INVENTION

The present invention relates to a color image forming apparatus and method for forming a color image.

As an example of a prior art apparatus and method, there is a conventional color copying machine of the thermal transfer type which makes color copies by using thermal transfer ink ribbons with a plurality of colors. In such a conventional apparatus, a document is scanned by an optical scanner and the image signal of the document is separated into color component signals corresponding to the colors of the thermal transfer ink ribbons. After all of these color component signals are stored in the memory, they are read out for every color and the image of each color is overlappingly, thermally transferred onto the copy paper, so that a full color copy is formed. Therefore, a memory with a large capacity is required, causing an increase in cost. The miniaturization of such a machine is impossible due to the space the memory occupies, since all of the color component signals are stored in the memory and, thereafter are read out. There is also a drawback in that copying by this method takes a long time.

SUMMARY OF THE INVENTION

It is an object of the present invention to provide an image forming apparatus and method in which the memory required for storing all the image signals of the document is reduced, the cost is thereby reduced, miniaturization is realized, and a color image can be formed in a short time.

This object is realized by an image forming apparatus and method in which a scanner reads out an image signal of a document by optically scanning the document, a color separating circuit converts the image signal from the scanner to a plurality of color component signals, an image forming section overlappingly forms an image for each single color component on an image forming medium in response to the color component signal from the color separating circuit, thereby forming full color image, and a control circuit which allows the scanner to scan the document only the same number of times as the number of output color components of the color separating circuit and sequentially supplies one of the color component signals to the image forming section at each scanning time.

According to such an image forming apparatus and method, by forming the image of one color on the image forming medium at each time when the document is scanned and by repeatedly performing this operation by only the number of times corresponding to the number of color components, the color image is formed. Therefore, there is no need to store all the image signal for every color component and the memory with a large capacity is unnecessary, so that the above-mentioned problems are solved.

BRIEF DESCRIPTION OF THE DRAWINGS

FIGS. 10A and 10B are flowcharts showing another method according to the present invention.

DETAILED DESCRIPTION OF THE PREFERRED EMBODIMENT

Figure 1:
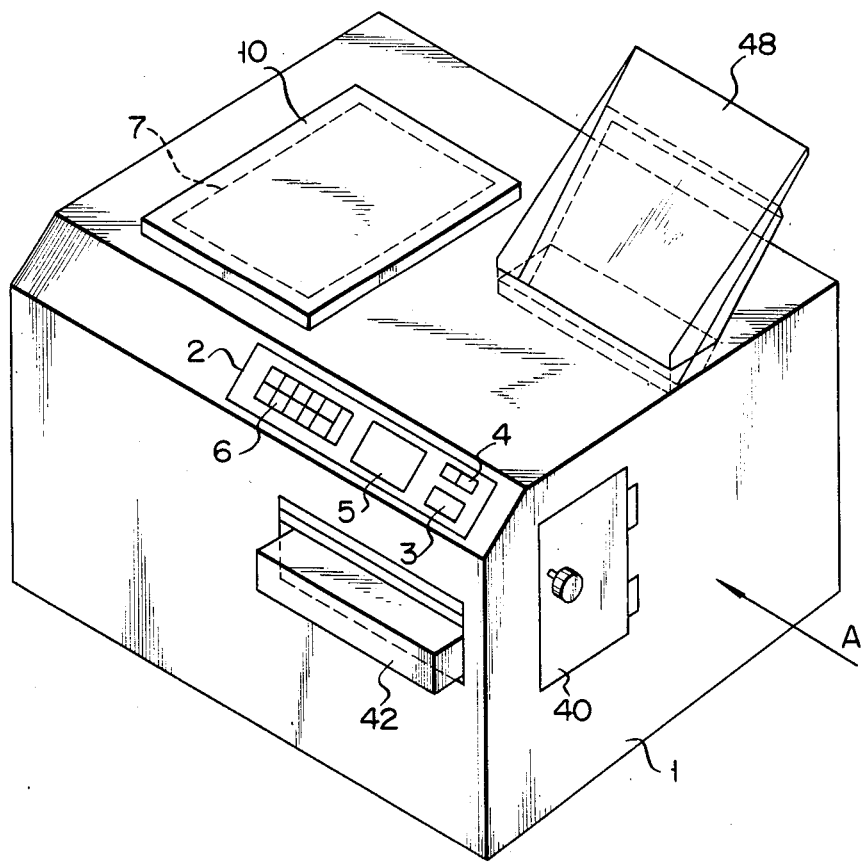
FIG. 1 is a perspective view showing the external view of a color copying machine of the thermal transfer type as the preferred embodiment of the image forming apparatus according to the present invention.
Figure 2:
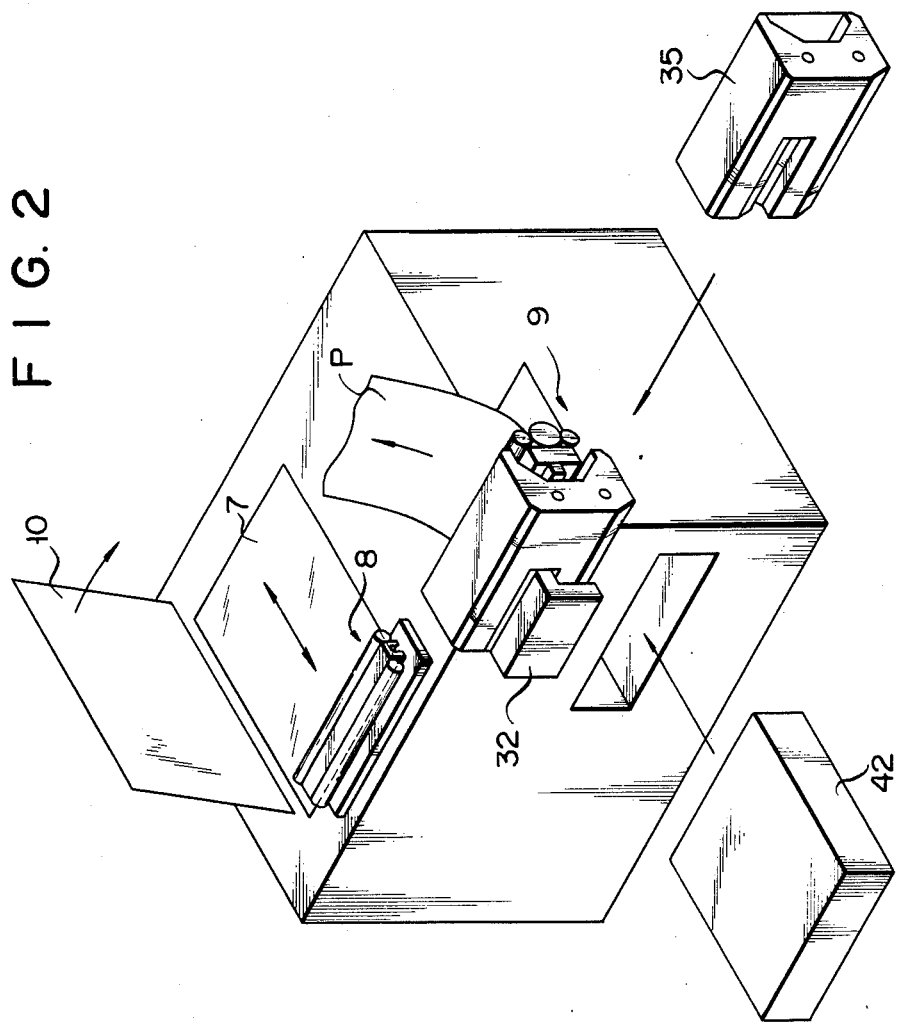
FIG. 2 is a perspective view of a copy machine according to the present invention showing several of the internal components of said machine.

One embodiment of the image forming apparatus according to the present invention, together with the method according to the present invention, will now be described with reference to the drawings. As the image forming apparatus, an example of the color copying machine of the thermal transfer type will be explained. FIG. 1 is a perspective view of this embodiment, and FIG. 2 is a view in which several of the internal components FIG. 1 are seen. On the front side of the upper surface of a main body 1 of the copying machine, an operation panel 2 is provided and this panel 2 has a start key 3, a display 4 to indicate the number of desired copies, a mode indicator 5 to indicate the operation state, a ten-key pad 6 to set the number of desired copies, etc. A document table 7 made of a transparent glass and a document cover 10 are equipped on the left of the upper surface of the main body 1, while a copy discharge tray 48, onto which the copies are discharged after the copy has been completed, is equipped on the right. A scanner 8 to scan and read out the image signal of the document is provided below the document table 7 in the main body 1. An image forming section 9 to form an image in response to an output of the scanner 8 is equipped on the right in the main body 1.

Figure 3:
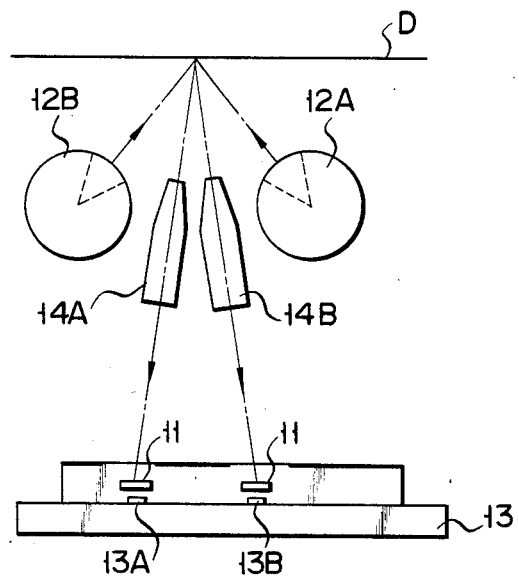
FIG. 3 is a cross sectional view showing a construction of the readout section in the scanner which is used in this embodiment.
Figure 4:
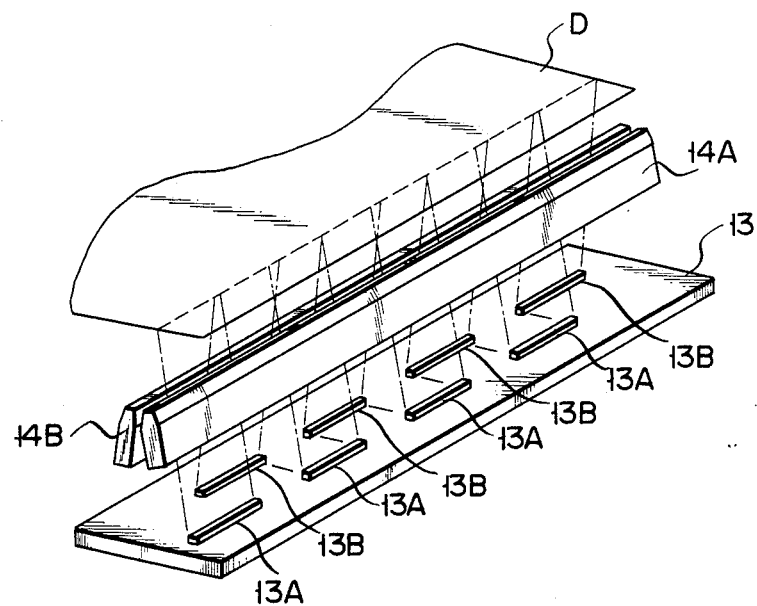
FIG. 4 is a perspective view showing the construction of FIG. 3 readout section.
Figure 5:
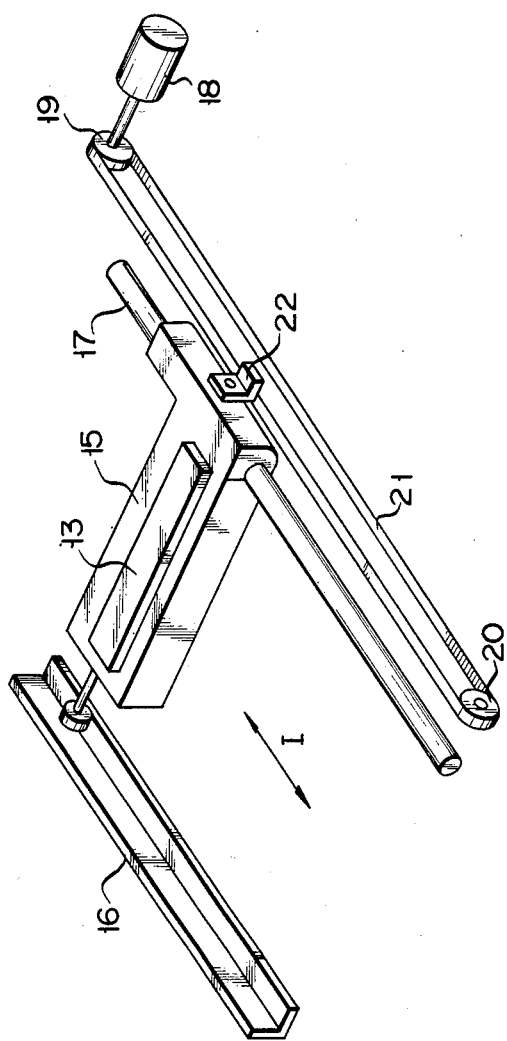
FIG. 5 is a perspective view showing the construction of the scanning mechanism of the FIG. 3 scanner.

The scanner 8 comprises a readout section shown in FIGS. 3 and 4 and a scanning mechanism shown in FIG. 5 which reciprocally moves the readout section along the document. FIG. 3 is a cross sectional view of the readout section and FIG. 4 is a perspective view thereof. The readout section comprises: exposing lamps 12A and 12B to obliquely illuminate one scanning line of a document D from both sides of the scanning line, a number of first and second photoelectric converters 13A and 13B to receive the light radiated from the exposing lamps 12A and 12B, respectively, and reflected by the scanning line of the document D, and optical systems (rod lenses) 14A and 14B to guide the reflected lights to the photoelectric converters 13A and 13B. As shown in FIG. 4, the first and second photoelectric converters 13A and 13B are alternately arranged in parallel to one another and consist of, for example, CCD line image sensors or the like. Color filters 11 of Y (yellow), G (green) and C (cyan) are attached, like a mosaic for every pixel, to the first and second photoelectric converters 13A and 13B. Filters 11 are not shown in FIG. 4. Color filters of R (red), G (green) and B (blue) are most desirable for color reproduction. However, RGB color filters suitable for this copy machine are not manufactured. Therefore, YGC color filters are used.

The readout section is attached to the scanning mechanism, as shown in FIG. 5, which can be reciprocally moved along the lower surface of the document table 7 in the direction indicated by an arrow I, shown in FIG. 5. The base plate 13 of the readout section is fixed to a carriage 15. The carriage 15 is guided by a guide rail 16 and a guide bar 17 so that it can be freely reciprocally moved in the direction of the arrow I. An endless belt 21 is installed between a driven pulley 19 and a follower pulley 20 along the guide bar 17. The drive pulley 19 is connected to the drive shaft of a scanning motor 18 whose rotational direction can be reversed. A part of the endless belt 21 is fixedly connected to the carriage 15 through a fixing member 22. Thus, the carriage 15 is moved in the direction of the arrow I shown in association with the rotation of the scanning motor 18.

Figure 6:
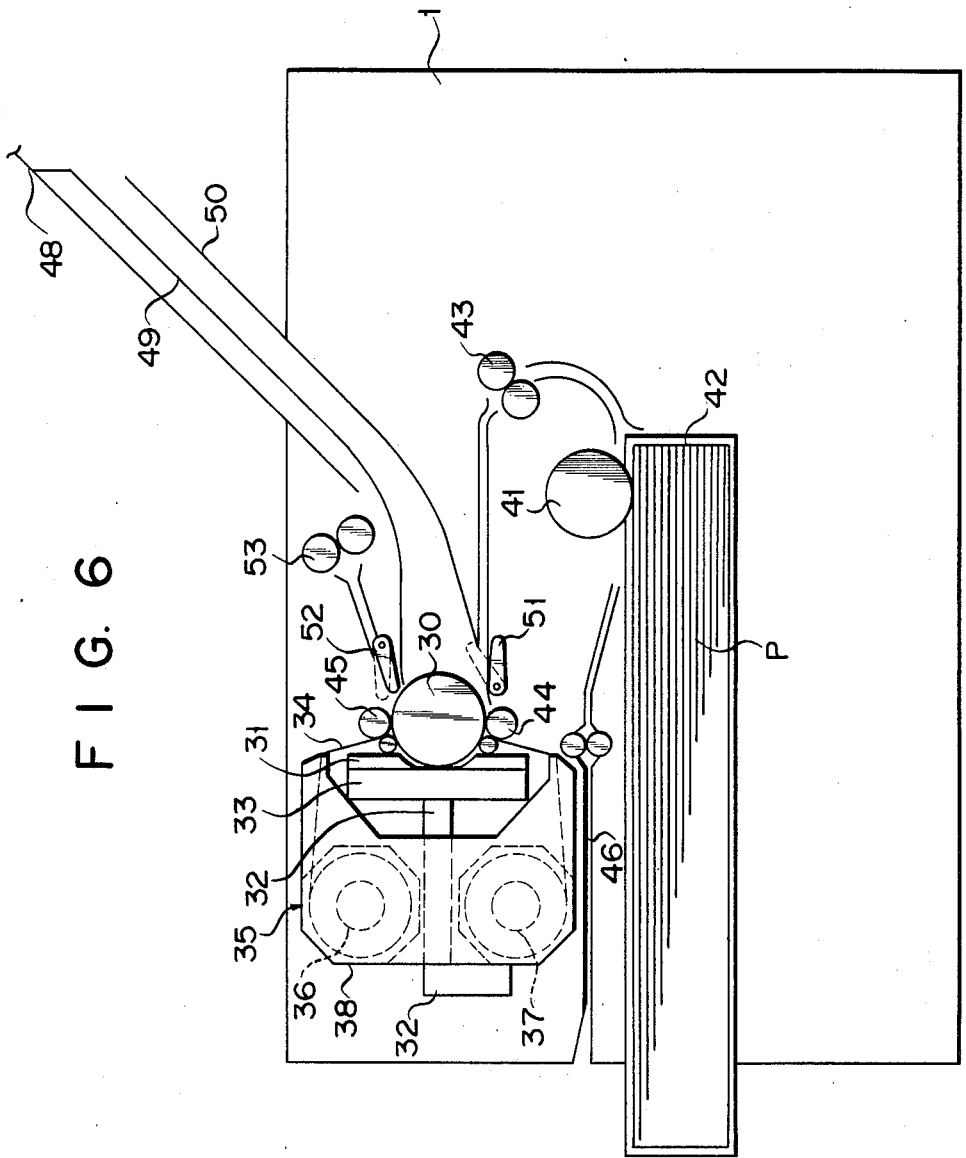
FIG. 6 is a cross sectional view showing the internal construction of the preferred embodiment, as seen from the direction indicated by an arrow A of FIG. 1.

Next, the details of the image forming portion 9 will be explained with reference to FIG. 6. FIG. 6 is a cross sectional view showing the image forming section 9 when it is seen from the direction indicated by an arrow A in FIG. 1. A platen roller 30 is horizontally attached in substantially the central portion of the image forming section 9. A thermal head 31 is located adjacent to the front side of the platen roller 30. The thermal head 31 is attached to a radiator 33 integrally formed on the rear end surface of a holder 32. As shown in FIG. 2, a ribbon cassette 35, which encloses a thermal transfer ink ribbon 34, is detachably installed in the holder 32 through an inserting/removing port provided on the right side of the main body 1. A lid 40, when can be freely opened and closed, is provided at the inserting/removing port. When the ribbon cassette 35 is installed in the holder 32, the thermal transfer ink ribbon 34 is interposed between the thermal head 31 and the platen roller 30. The ribbon cassette 35 comprises a supply reel 36 and a take-up reel 37 to which both ends of the thermal transfer copying ink ribbon 34 are respectively connected, and a casing 38, a portion thereof being open so that the thermal transfer ink ribbon 34 may be interposed between the platen roller 30 and the thermal head 31. When the ribbon cassette 35 is installed in the main body 1, the supply reel 36 and the take-up reel 37 are coupled to the drive shaft of a motor (not shown) for carrying the ink ribbon through a driving force transferring mechanism (not shown) and are rotated and dependently driven.

A paper feed cassette 42, in which copy papers P are enclosed, is provided below the platen roller 30. The copy papers P in the paper feed cassette 42 are picked up one by one due to the rotation of a paper feed roller 41, provided beneath the platen roller 30, in the oblique direction on the right side of the cassette. The edge of each copy paper P thus picked up is aligned by a resist roller 43 provided above the paper feed roller 41 in the oblique direction on the right side of cassette 42. Thereafter, the copy paper P is carried toward the platen roller 30. Two pressing rollers 44 and 45 come into pressure contact with the platen roller 30, and the copy paper P is wrapped around the platen roller 30 by these pressing rollers 44 and 45, then paper P is accurately set in position and is carried by platen roller 30. When the copy paper P reaches a location between the thermal head 31 and the platen roller 30, the ink is transferred from the ink ribbon 34 onto the paper P due to the heat radiated from the thermal head 31, so that the copy paper P is printed. Thereafter, the copy paper P is discharged onto the copy discharge tray 48 through a paper discharge roller 53. Gates 51 and 52 are provided before and behind the pressing rollers 44 and 45, over the carrying passage for the copy paper P, so that the carrying passage is selectively shut and opened. The gate 51 doesn't shut the carrying passage when the paper is carried in the forward direction, but it wraps the paper onto the platen roller 30. On the other hand, when the paper is carried in the reverse direction, to perform the transfer and to copy the second and subsequent color inks, the gate 51 shuts the carrying passage and guides the paper toward a first guide plate 50. Until the transfer and copy of all of the color inks are finished, the gate 52 shuts the carrying passage so that the paper is not carried to the copy discharge tray 48, thereby guiding the paper toward a second guide plate 49. After the transfer and copy of all of the color inks have been completed, the gate 52 opens the carrying passage and guides the paper to the copy discharge tray 48. The paper feed cassette 42 can be freely attached to and detached from the main body 1 from the front surface of the main body. In addition, in this embodiment, a manual feed section 46 is also provided on the front side of the main body 1 so that the copy papers can be supplied, one by one, by hand.

Figure 7:
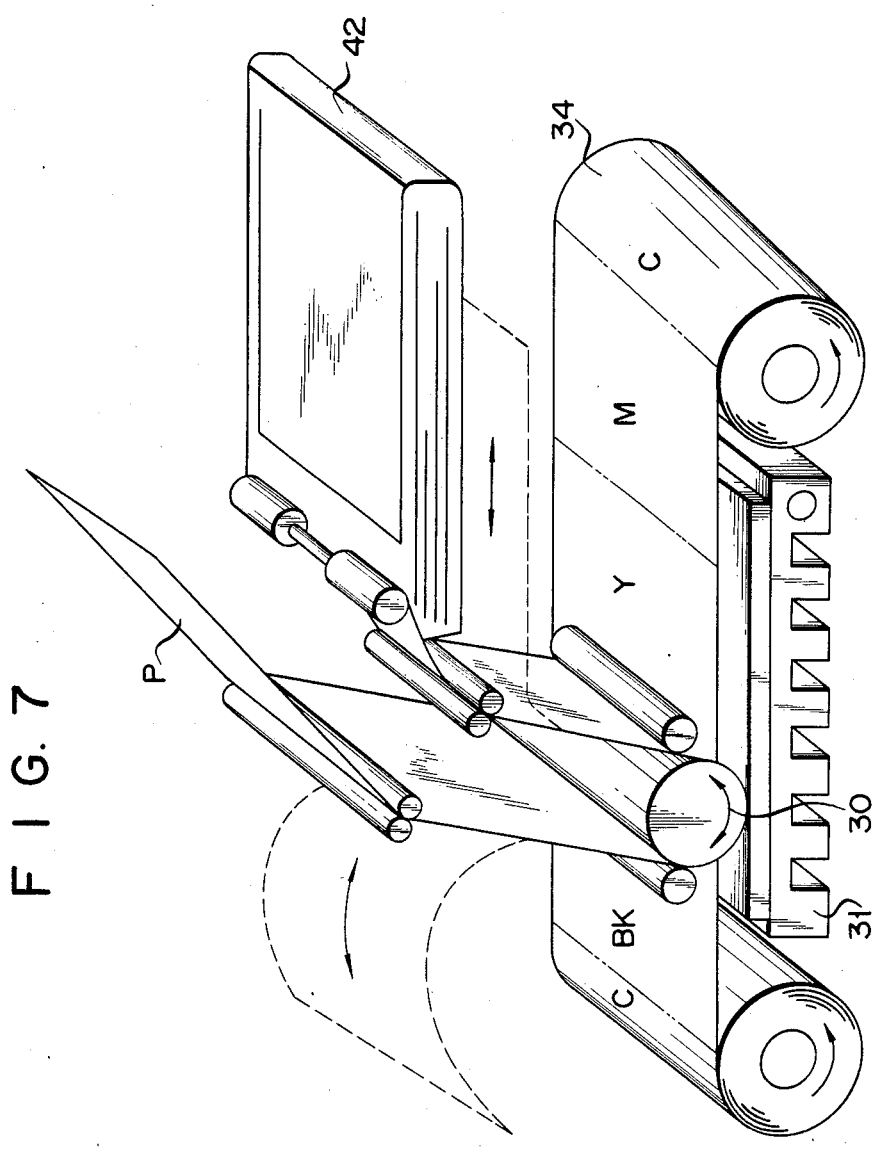
FIG. 7 is a diagram showing the method of the image formation of the preferred embodiment.

The copying principle of this embodiment will now be described with reference to FIG. 7. The thermal head 31 has an array of heating elements arranged in a line along the axial direction of the platen roller 30 at the contact surface with the platen roller 30. When the copy paper supplied from the paper feed cassette 42 is inserted between the platen roller 30 and the ink ribbon 34, the thermal head 31 presses the copy paper P onto the platen roller 30 through the ink ribbon 34, and at the same time, the heating element array is heated in accordance with the image signal. The ink, as the colorant on the ink ribbon 34, is melted and is thermally transferred on the copy paper P on a line by line basis. The lateral width of the ink ribbon 34 is equal to that of the copy paper (for this example, it is assumed that the size of the copy paper P is only one kind). The ink regions of Y (yellow), M (magenta), C (cyan), and BK (black) are repeated on the ink ribbon 34 for every length which is substantially equal to (or slightly longer than) the longitudinal length of the copy paper P. The images of yellow, magenta, cyan, and black are formed to overlap on the copy paper P for every required color. After the formation of the images of all lines for each color has been completed, the color paper is carried in the reverse direction, so that the first scanning line of the copy paper comes between the thermal head 31 and the platen roller 30. The ink ribbon 34 is slightly moved in the forward direction, so that the first portion of the ink region of the next color comes to the position of the thermal head 31.

Figure 8:
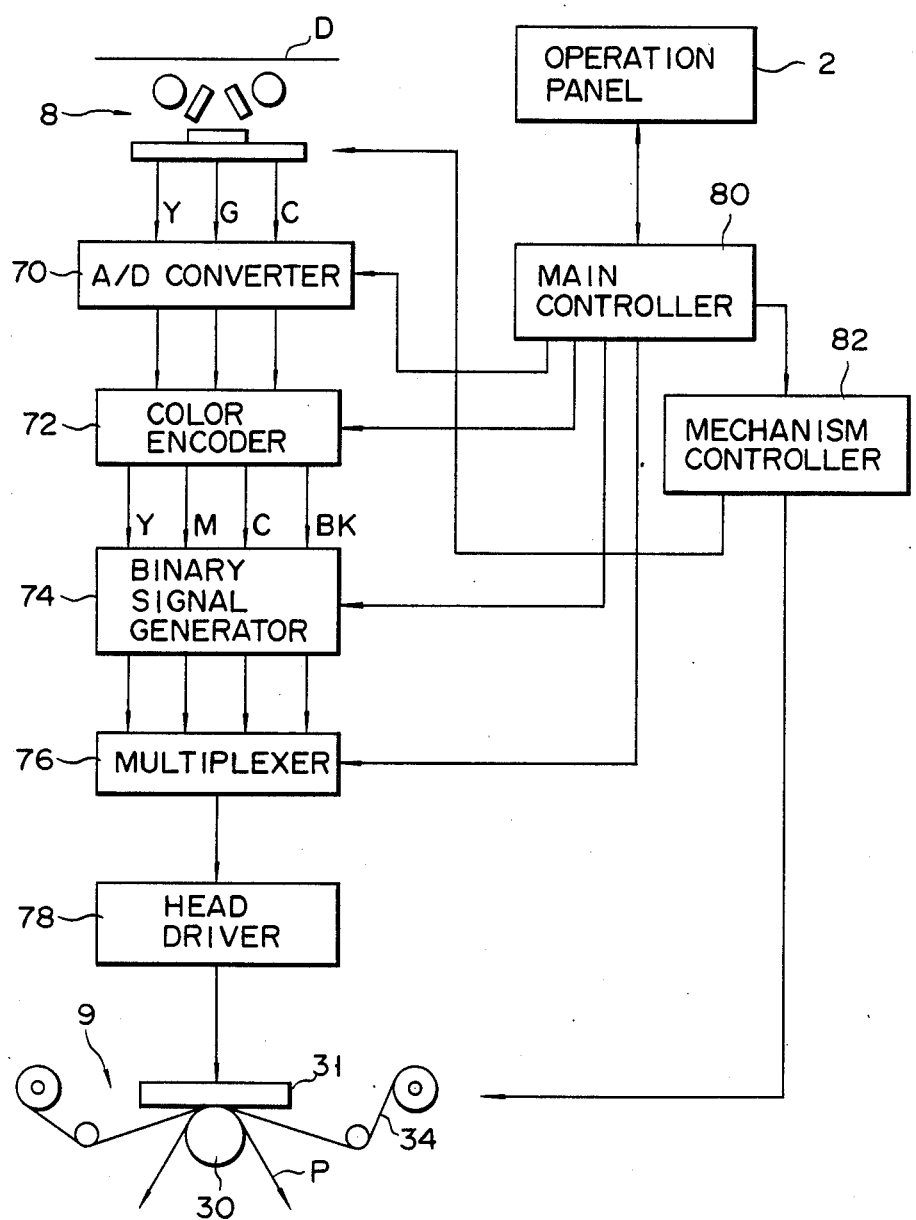
FIG. 8 is a block diagram of the control circuit of the preferred embodiment.

FIG. 8 shows a block diagram of the control circuit of this embodiment. The output color component signals Y, G and C of the scanner 8 are input to a color encoder 72 through an A/D converter 70. The color encoder 72 converts the output color component signals Y, G and C of the scanner 8 to the color component signals Y, M, C, and BK (the four colors of the colors of the ink ribbon 34). The output color components Y and C of the encoder 72 are not completely identical to the output color components Y and C of the scanner 8. The output component signals Y, M, C, and BK of the color encoder 72 are supplied to a binary signal generator 74 and converted to binary coded signals. Namely, they are converted to on/off signals representing whether or not the heating elements of the thermal heads are heated. These on/off signals of the component signals Y, M, C, and BK are supplied to a multiplexer 76, and the appropriate color component signal is selected. An output of the multiplexer 76 is supplied through a head driver 78 to the image forming section 9, i.e., the thermal head 31. The input signal from the operation panel 2 is input to a main controller 80 consisting of a microprocessor or the like. The control signals from the main controller 80 are supplied to the A/D converter 70, color encoder 72, binary signal generator 74, and multiplexer 76. The control signals from a mechanism controller 82 connected to the main controller 80 are supplied to the scanner 8 and the image forming section 9 (carrying section of the ink ribbon and copy paper).

Figure 9:
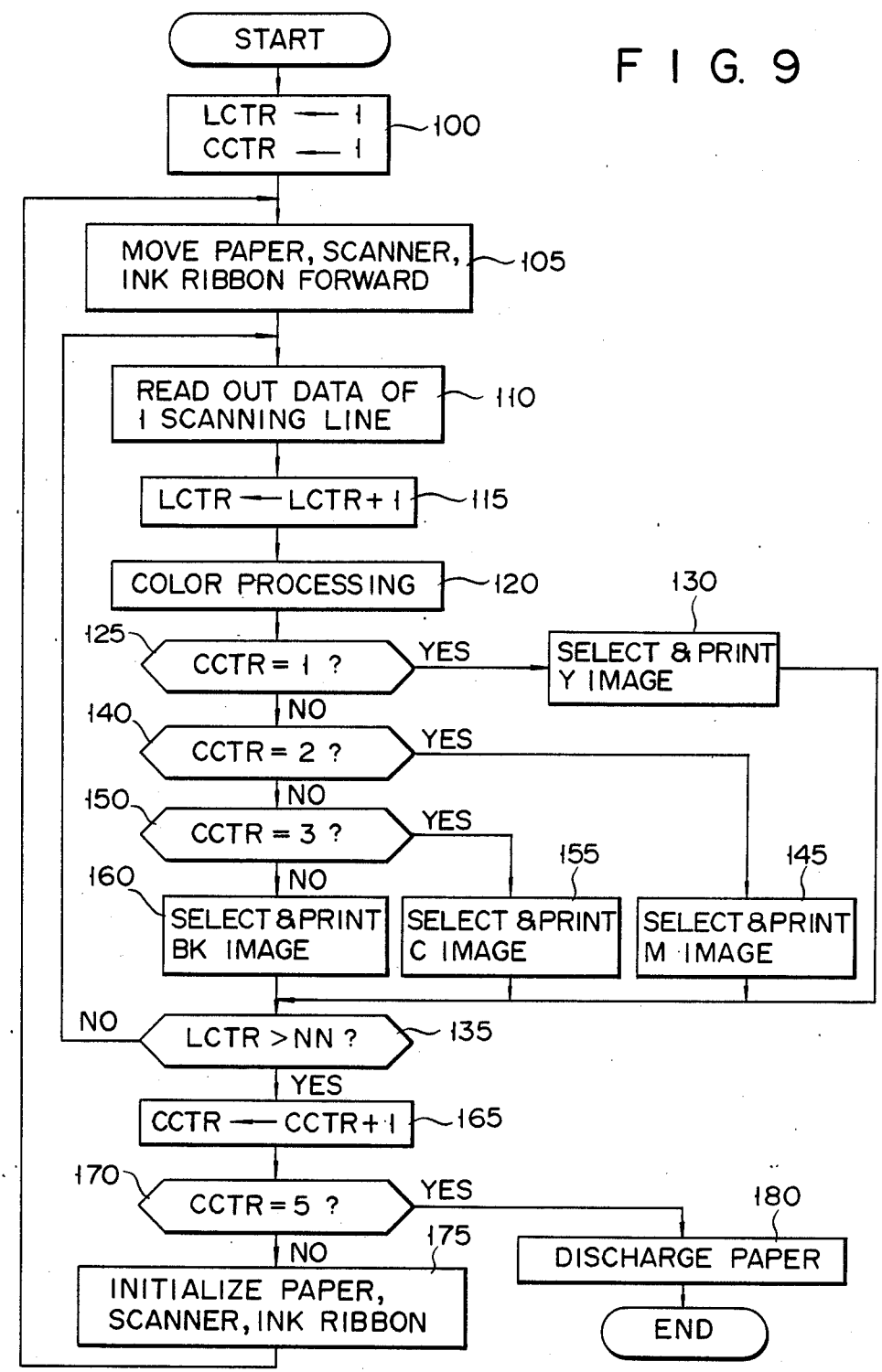
FIG. 9 is a flowchart showing an example of the method of the present invention.

The method of forming an image according to the present invention will now be described with reference to the flowchart of FIG. 9. When the start key 3 on the operation panel 2 is depressed, the operation is started, so that as shown in step 100, a line counter LCTR and a color counter CCTR in the microprocessor in the main controller 80 are set to "1". In step 105, the scanner 8 is carried in the forward direction and the readout scanning of the document is started. At the same time, the image forming section 9 is controlled, thereby carrying the copy paper and the ink ribbon interlockingly in the forward direction. Thereafter, as shown in step 110, the image data of one scanning line of the document is read out. Namely, the outputs of the first and second photoelectric converting elements 13A and 13B are transmitted to the A/D converter 70. After the readout of the image signal of one scanning line has been finished, the line counter LCTR is incremented by 1 as shown in step 115. That is, the count value of the line counter LCTR represents the number of scanning lines of the document read out. In step 120, the output color component signals Y, G and C of the A/D converter 70 are converted by the color encoder 72 to the four color component signals Y, M, C, and BK for the thermal transfer copying.

Subsequently, in step 125, the color counter is checked to determine whether or not the color counter CCTR is "1". As will be explained later, since the color counter CCTR is incremented by 1 when the transfer of the image corresponding to one color component is finished, the color counter CCTR indicates which order number of color is being presently transferred. As shown in step 130, when the color counter CCTR indicates "1", the signal indicative of the first color, i.e., the Y signal, is selected by the multiplexer 76 and is supplied to the thermal head 31, so that the Y image is formed on the copy paper. Then, the process advances to step 135. On the other hand, when the color counter CCTR doesn't indicate "1" in step 135, the color counter is checked in step 140 to determine whether or not the color counter CCTR is "2". When the color counter CCTR represents "2", the signal indicative of the second color, i.e., the M signal, is selected by the multiplexer 76 and is supplied to the thermal head 31 in step 145. Thus, the M image is further formed on the copy paper on which the Y image has already been formed. Then, the processing advances the step 135. When the color counter CCTR is not "2" in step 140, the color counter is checked in step 150 to determine whether or not the color counter CCTR is "3". When the color counter CCTR indicates "3", the signal indicative of the third color, i.e., the C signal, is selected by the multiplexer 76 and is supplied to the thermal head 31. Thus, the C image is further formed on the copy paper on which both Y and M images have already been formed in step 155, and the processing advances to step 135. When the color counter CCTR is not "3" in step 150, as shown in step 160, the signal representative of the fourth color, i.e., the BK signal, is selected by the multiplexer 75 and is supplied to the thermal head 31. Therefore, the BK image is further formed on the copy paper on which the Y, M and C images have already been formed, then the processing advances to step 135. After processing of step 160, the color image, composed of four primary colors Y, M, C, and BK, is formed.

In step 135, the line counter is checked to determine whether or not the whole document has been scanned and read, by using the line counter LCTR. In other words, the line counter is to determine whether or not the line counter LCTR is larger than the number of all scanning lines NN representative of one sheet of the whole document, which is determined by the length of the document and the resolution of this copying machine. When the line counter LCTR is equal to or smaller than NN, the processing of step 110 is again executed and the image formation of the next scanning line is read out. When the line counter LCTR is larger than NN, this means that the whole document has been scanned and read out and that the image formation of one color has been finished. Thus, as shown in step 165, the color counter CCTR is incremented by 1. Then in step 170, the color counter is checked to determine whether or not the color counter CCTR is "5", namely, it is checked to determine whether or not the image formation of four colors has been finished. When the color counter CCTR is not "5", as shown in step 175, the copy paper is carried in the reverse direction and the first scanning line of the copy paper comes between the thermal head 31 and the platen roller 30. The scanner 8 is carried in the reverse direction and is returned to the initial position. The ink ribbon is slightly carried in the forward direction so that the ink region of the next color comes to the position of the thermal head 31. Thereafter, step 105 is again executed and the image formation of the next color is started. When the color counter CCTR is determined to be "5" in step 170, as shown in step 180, the copy paper is discharged onto the copy discharge tray 48, and the formation of one color copy is finished.

As described above, according to this embodiment, the scanner scans the document four times; the Y component image is transferred and copied at the first scanning time; the M component image is transferred and copied at the second scanning time; the C component image is transferred and copied at the third scanning time; and the BK component image is transferred and copied at the fourth scanning time, thereby one sheet of color copy is formed. Therefore, there is no need to store the image signal read out from the document, and a lower cost and miniaturization of the apparatus can be realized. In addition, since the transfer and copy are performed simultaneously with the scanning of the document, the copying time is also shortened.

Figure 10A:
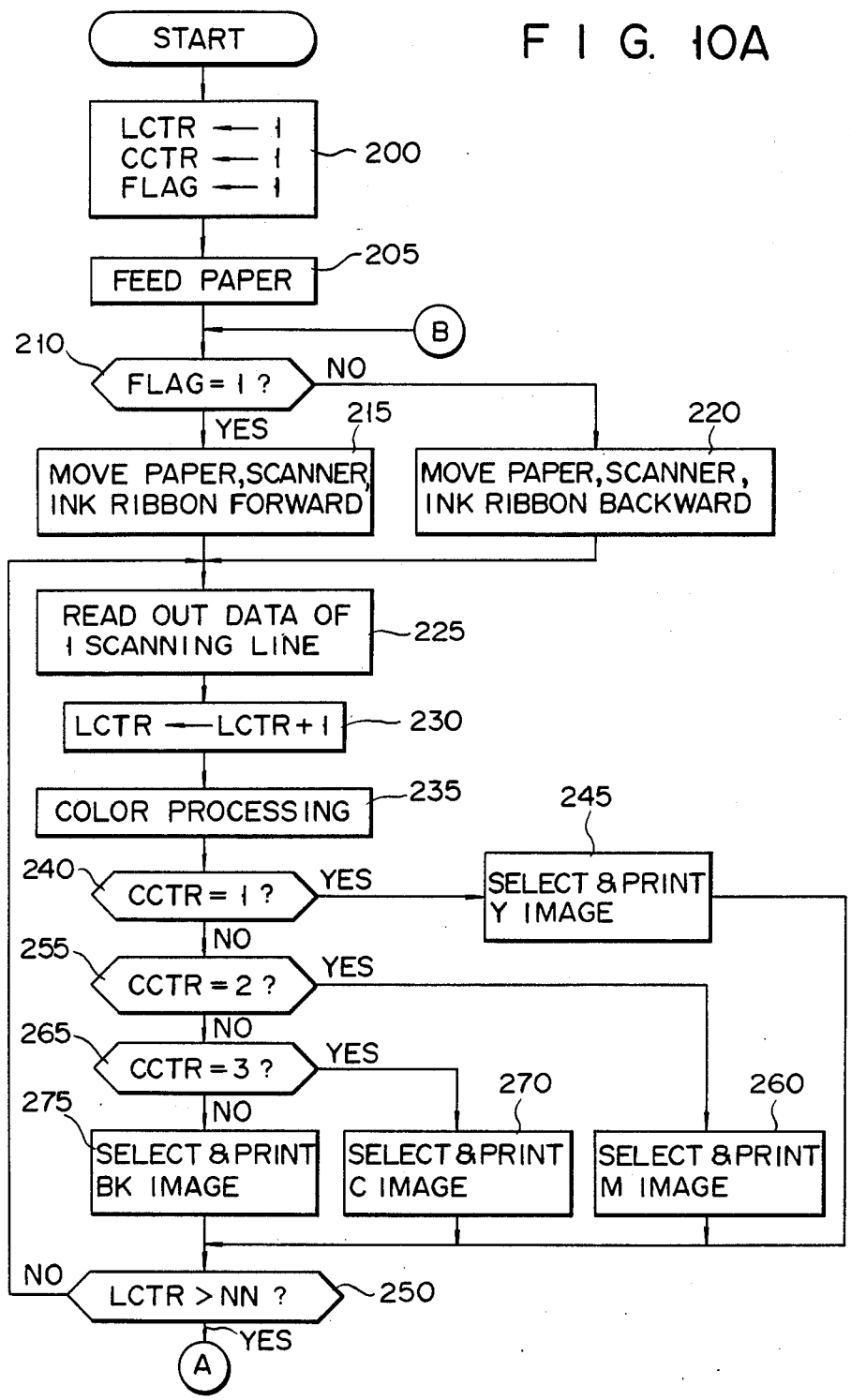

Another example of a method according to the present invention will now be described. FIGS. 10A and 10B show the flowcharts in this case. When the operation is started, as shown in step 200, the line counter LCTR and color counter CCTR are set to "1", and at the same time a flag FLAG is also set to "1". In step 205, the copy paper is fed to the portion between the platen roller 30 and the thermal head 31. In step 210, the flag is checked to determine whether or not the flag FLAG is "1". As will be mentioned later, when the first scanning of a document by the scanner is finished, the flag FLAG is inverted to "0" when it is "1", while it is inverted to "1" when it is "0". As a consequence, the flag FLAG indicates that the scanning which will next be performed is the scanning at the odd numbered time or the even numbered time. In the earlier-described example of the operation, the scanner scans the document only when it is moved in the forward direction, and when each scanning of the document is finished, the scanner is immediately returned to the initial position. Thus, the time taken for the scanner to travel in the reverse direction is a wasted time period. Therefore, in the FIGS. 10A and 10B example, the document is scanned and the image is transferred and copied even during the reverse movement of the scanner. Namely, the transfer and copy of the first and third colors are performed when the scanner is moved in the forward direction, while the transfer and copy of the second and fourth colors are performed when the scanner is moved in the reverse direction. In step 210, when the flag FLAG is determined to be "1", the copy paper, ink ribbon and scanner are driven in the forward direction, step 215. When the flag FLAG is determined to be "0", the copy paper, ink ribbon and scanner are driven in the backward direction, step 220.

Thereafter, as shown in step 225, the image signal of one scanning line of the document is read out. After the readout of the image signal of one scanning line has been finished, the line counter LCTR is incremented by 1 as shown in step 230. In step 235, the outputs Y, G and C of the scanner 8 are converted by the color encoder 72 to the four color component signals Y, M, C, and BK for the thermal transfer.

Next, similarly to the earlier described example, the color counter is checked in step 240 to determine whether or not the color counter CCTR is "1". When the color counter CCTR indicates "1", the Y image is formed on the copy paper in step 245 and the processing advances to step 250. When the color counter CCTR is not "1" in step 240, the color counter is checked in step 255 to determine whether or not the color counter CCTR is "2". When the color counter CCTR is "2", the M image is further formed on the copy paper on which the Y image has already been formed, in the step 260, and the process advances to step 250. When the color counter CCTR doesn't indicate "2" in step 255, it is checked in step 265 to determine whether or not the color counter CCTR is "3". When the color counter CCTR is "3", the C image is further formed on the copy paper on which the Y and M images have already been formed, in step 270. Then, the processing advances to step 250. When the color counter CCTR is not "3" in step 265, the BK image is further formed, in step 275, on the copy paper on which the Y, M and C images have already been formed and the processing advances to step 250.

In step 250, the line counter is checked to determine whether or not the line counter LCTR is larger than the number of all scanning lines NN. When the line counter LCTR is equal to or smaller than NN, step 225 is again executed and the image signal of the next scanning line is read out. When the line counter LCTR is larger than NN, the whole document has been scanned and read out and this means that the image formation of one color has been finished. Thus, as shown in step 280, the movement of the copy paper, ink ribbon and scanner is stopped. In step 285, the ink ribbon is moved so that the ink region of the next color comes to the position of the thermal head. In step 290, the color counter CCTR is incremented by 1. In step 295, the color counter is checked to determine whether or not the color counter CCTR is "5", namely, it is checked to determine whether or not the image formation of four colors has been completed. When the color counter CCTR is not "5", the flag is checked in step 300 to determine whether or not the flag FLAG is "1". When the flag FLAG is "1", the flag FLAG is set to "0" in step 305. On the other hand, when the flag FLAG is not "1", the flag FLAG is set to "1" in step 310. Step 210 is again executed and the image formation of the next color is started. When the color counter CCTR is determined to be "5" in step 295, as shown in step 315, the copy paper is discharged onto the copy discharge tray 48 and the formation of one color copy is finished.

According to the FIGS. 10A and 10B example, since the scanning of the document and the transfer of color are performed in both forward and backward movements of the scanner, it is possible to finish the formation of the color copy in a shorter time period than that in the earlier described example.

Although examples of apparatus and method according to the present invention have been described for a copying machine of the thermal transfer type, the invention is not limited to only these kinds of copying machines. Other copying machines of the wire-dot type, the electrophotographic (laser printer or the like) type and the ink-jet type may be used. Further, the invention is not limited to the copying machine, but can be also applied to a facsimile apparatus.

As described above, according to the present invention, the image of one color is formed on the image forming medium simultaneously with the scanning of the document. By repeatedly performing this operation by only the number of times corresponding to the number of color components, the color image can be formed in a short time period without requiring the memory to store the image signal.

What is claimed is:

1. A color image forming apparatus comprising:
    scanner means for repetitively optically scanning an image on a stationary document and producing an output image related thereto;
    color separating means for converting said output image to a plurality of color component signals, said color separating means including a photoelectric convertor arranged substantially in a line, and a color-separation filter mounted on an upper surface of said photoelectric converter parallel to said line;
    image forming means for forming a full color image by overlapping single color images on an image forming medium, each of said single color images formed from one of said plurality of color component signals at the time of one of the repetitive optical scans; and
    control means for controlling said scanner means so that said document is respectively scanned once for each of said color component signals, and for sequentially supplying one of said plurality of color component signals to said image forming means during each scan repetition.

2. An apparatus according to claim 1, wherein:
said apparatus further comprises means for reciprocally moving said scanner means with respect to said document so that said scanner means scans said document each time said scanner means is moved in each of a forward and a backward direction; and
said control means respectively supplying one of said plurality of color component signals to said image forming means when said scanner means is moved in each said direction.

3. An apparatus according to claim 2, wherein said plurality of color component signals includes alternating odd and even numbered color component signals, and wherein said control means respectively supplies odd-numbered and even-numbered color component signals to said image forming means when said scanner means is moved in said forward and said backward directions, respectively.

4. An apparatus according to claim 1, wherein said scanner means outputs image signals of at least two color components.

5. An apparatus according to claim 4, wherein said scanner means outputs image signals of the three color components of yellow, green and cyan.

6. An apparatus according to claim 1, wherein said color separating means converts said output image signals to color component signals of at least three colors.

7. An apparatus according to claim 6, wherein said color separating means converts said output image signals to color component signals of four colors of yellow, magenta, cyan, and black.

8. An apparatus according to claim 1, wherein said image forming means is a printer of the thermal transfer type.

9. An apparatus according to claim 1, wherein said image forming means is a printer of the wire-dot type.

10. An apparatus according to claim 1, wherein said image forming means is a printer of the electrophotographic type.

11. An apparatus according to claim 1, wherein said image forming means is a printer of the ink-jet type.

12. A method for forming a full color image comprising the steps of:
scanning an image of a stationery document repetitively and sequentially producing an output image related to said document image;
sequentially converting said output image into a plurality of color component signals by receiving light reflected from said stationary document, filtering said reflected light into color components with a color-separation filter, and converting said color components into said plurality of color component signals with a photoelectric convertor arranged in line and having said color-separation filter mounted on an upper surface thereof and parallel with said line, the number of scan repetitions in said scanning step being limited to the number of said color component signals; and
sequentially creating a plurality of single color images on an image forming medium, each signal color-image created from one of said color component signals at the time of one of the repetitive optical scans, said signal color images forming a full color image when they are overlapped on said image forming medium.

13. A method according to claim 12 wherein said scanning step alternates between a foreward scan and a backward scan.

14. A method according to claim 12 wherein the number of color component signals is four.

15. A method according to claim 12 wherein the number of scan repetitions is four.

16. A method according to claim 13 wherein the number of foreward scan repetitions is two and the number of backward scan repetitions is two.

* * * * *

Notice of Adverse Decisions in Interference

In Interference No. 102,140, involving Patent No. 4,670,795, E. Yamanishi, COLOR IMAGE FORMING APPARATUS AND METHOD, final judgment adverse to the patentee was rendered Dec. 18, 1990, as to claims 1-16.

*(Official Gazette September 3, 1991.)*